United States Patent
Ananthapur Bache et al.

(10) Patent No.: US 10,440,530 B1
(45) Date of Patent: Oct. 8, 2019

(54) MOBILE TELEPHONE NUMBER SELECTOR

(71) Applicant: INTERNATIONAL BUSINESS MACHINES CORPORATION, Armonk, NY (US)

(72) Inventors: Vijay Kumar Ananthapur Bache, Bangalore (IN); Jhilam Bera, Bangalore (IN); Vijay Ekambaram, Chennai (IN); Saravanan Sadacharam, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/116,985

(22) Filed: Aug. 30, 2018

(51) Int. Cl.
*H04M 3/42* (2006.01)
*H04W 4/16* (2009.01)
*H04W 4/02* (2018.01)

(52) U.S. Cl.
CPC ......... *H04W 4/16* (2013.01); *H04M 3/42263* (2013.01); *H04M 3/42357* (2013.01); *H04W 4/02* (2013.01)

(58) Field of Classification Search
CPC ........... H04W 4/16; H04W 4/14; H04W 4/12; H04W 4/02; H04W 88/184; H04W 40/248; H04W 4/20
USPC ......... 455/417, 432.3, 414.1, 466, 566, 465, 455/456.3, 569.3, 456.1, 416, 502, 435.2, 455/13.1, 432.1, 435.1, 12.1
See application file for complete search history.

(56) References Cited

U.S. PATENT DOCUMENTS

| | | | |
|---|---|---|---|
| 7,248,835 B2 | 7/2007 | Fan et al. | |
| 8,194,833 B2 | 6/2012 | Carnazza et al. | |
| 8,499,037 B2 | 7/2013 | Ramnami | |
| 2003/0181202 A1* | 9/2003 | Link, II | H04M 1/006 455/417 |
| 2004/0266490 A1* | 12/2004 | Silver | H04M 3/02 455/567 |

(Continued)

OTHER PUBLICATIONS

Peter Mell et al, The NIST Definition of Cloud Computing, National Institute of Standards and Technology, Publication 800-145, 2011, entire document.

(Continued)

*Primary Examiner* — Joseph Arevalo
(74) *Attorney, Agent, or Firm* — Patrick J. Daugherty; Daugherty & Del Zoppo Co., LPA

(57) ABSTRACT

Embodiments selectively place or accept telephone calls based on recipient preference information, wherein processors are configured to determine whether a first telephone number of a different telephone numbers associated to an identified recipient is ranked highest relative to others of the telephone numbers within the ordered ranking for preferred use in calling the recipient at a local times and geographic locations of receiving mobile devices associated with the telephone numbers. In response to determining that the first number is not ranked highest, the embodiments stop execution of the initiated call to the first number and request authorization from the caller to place the call to another of the telephone numbers that is ranked highest within the ordered ranking. Embodiments further iteratively request authorization from the caller to place the call to others of the telephone numbers next-highest in rank, until placing the call to an authorized one.

14 Claims, 5 Drawing Sheets

(56) References Cited

U.S. PATENT DOCUMENTS

| | | | |
|---|---|---|---|
| 2005/0064844 A1* | 3/2005 | McAvoy | H04W 64/00 455/405 |
| 2005/0195802 A1 | 9/2005 | Klein et al. | |
| 2008/0194260 A1* | 8/2008 | Altberg | G06Q 30/02 455/435.1 |
| 2009/0042602 A1* | 2/2009 | Nagata | H04M 1/2745 455/556.1 |
| 2009/0150514 A1* | 6/2009 | Davis | H04L 29/12028 709/217 |
| 2011/0159878 A1 | 6/2011 | Bender et al. | |
| 2012/0052915 A1* | 3/2012 | Sung | H04M 1/72519 455/564 |
| 2012/0115453 A1 | 5/2012 | Zheng | |
| 2012/0115501 A1 | 5/2012 | Zheng | |
| 2012/0275442 A1 | 11/2012 | Melets et al. | |
| 2014/0050311 A1* | 2/2014 | Bhogal | H04M 3/487 379/218.01 |
| 2014/0067371 A1 | 3/2014 | Liensberger | |
| 2014/0179289 A1* | 6/2014 | Moon | H04W 4/12 455/415 |
| 2015/0365524 A1* | 12/2015 | Silver | H04M 3/02 455/415 |

OTHER PUBLICATIONS

Apple, Inc., iTunes Preview, Flypsi Inc., Multiple Phone Numbers for Calling & Texting, 2016, https://itunes.apple.com/us/app/flyp-multiple-phone-numbers, entire document.

Stack Overflow, Initiate a call to multiple numbers and wait for answer, Twilio, 2014, http://stackoverflow.com/questions/21837195, entire document.

\* cited by examiner

MOBILE TELEPHONE NUMBER SELECTOR

BACKGROUND

A phone call or data-transfer recipient may have multiple mobile-phone numbers and may have multiple mobile phones or devices operating through different telecommunications companies capable of making and receiving mobile phone calls and other data transfers.

SUMMARY

In one aspect of the present invention, a computerized method includes executing steps on a computer processor. Thus, a computer processor is configured to, in response to initiation of a call by a caller to a first telephone number of different telephone numbers that are each associated to an identified recipient, determine whether the first telephone number is ranked highest relative to the others in an ordered ranking for preferred use in calling the recipient at local times and geographic locations of receiving mobile devices associated with each telephone numbers. In response to determining that the first number is not ranked highest within the ordered ranking, the configured processor stops execution of the initiated call to the first number and requests authorization from the caller to place the call to a second number that is ranked highest within the ordered ranking. In response to determining that the caller has not provided a requested authorization, the configured processor iteratively requests authorization from the caller to place the call to another telephone number that is next-highest in rank, until placing the call to one of the telephone numbers in response to determining that the caller has provided the requested authorization.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to, in response to initiation of a call by a caller to a first telephone number of different telephone numbers that are each associated to an identified recipient, determine whether the first telephone number is ranked highest relative to the others in an ordered ranking for preferred use in calling the recipient at local times and geographic locations of receiving mobile devices associated with each telephone numbers. In response to determining that the first number is not ranked highest within the order ranking, the configured processor stops execution of the initiated call to the first number and requests authorization from the caller to place the call to a second number that is ranked highest within the ordered ranking. In response to determining that the caller has not provided the requested authorization, the configured processor iteratively requests authorization from the caller to place the call to another telephone number that is next-highest in rank, until placing the call to one of the telephone numbers in response to determining that the caller has provided the requested authorization.

In another aspect, a computer program product for selective acceptance of a telephone call request based on recipient preference information has a computer-readable storage medium with computer readable program code embodied therewith. The computer readable hardware medium is not a transitory signal per se. The computer readable program code includes instructions for execution which cause the processor to, in response to initiation of a call by a caller to a first telephone number of different telephone numbers that are each associated to an identified recipient, determine whether the first telephone number is ranked highest relative to the others in an ordered ranking for preferred use in calling the recipient at local times and geographic locations of receiving mobile devices associated with each telephone numbers. The processor is further configured to stop execution of the initiated call to the first number and request authorization from the caller to place the call to a second number that is ranked highest within the ordered ranking, in response to determining that the first number is not ranked highest within the order ranking. The processor is further configured to iteratively request authorization from the caller to place the call to another telephone number that is next-highest in rank, until placing the call to one of the telephone numbers in response to determining that the caller has provided the requested authorization.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
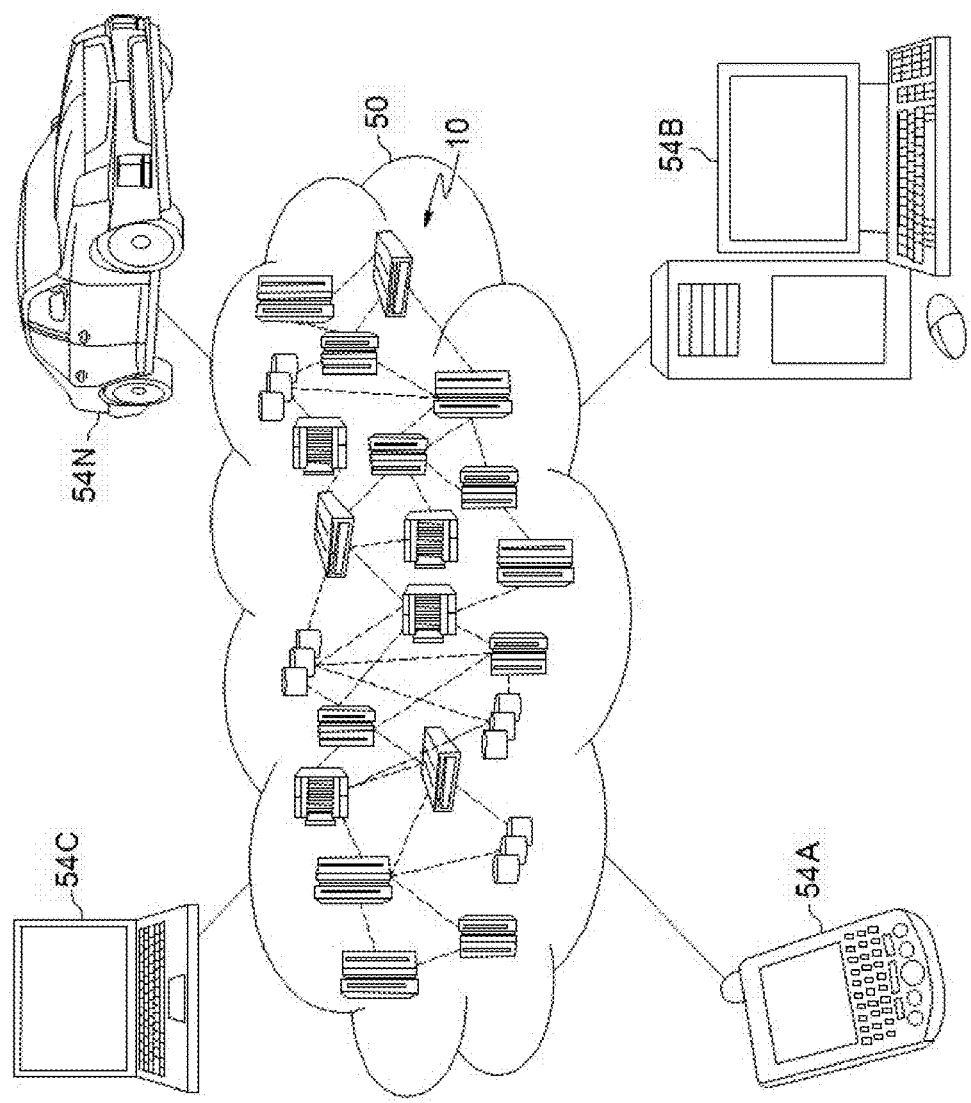
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
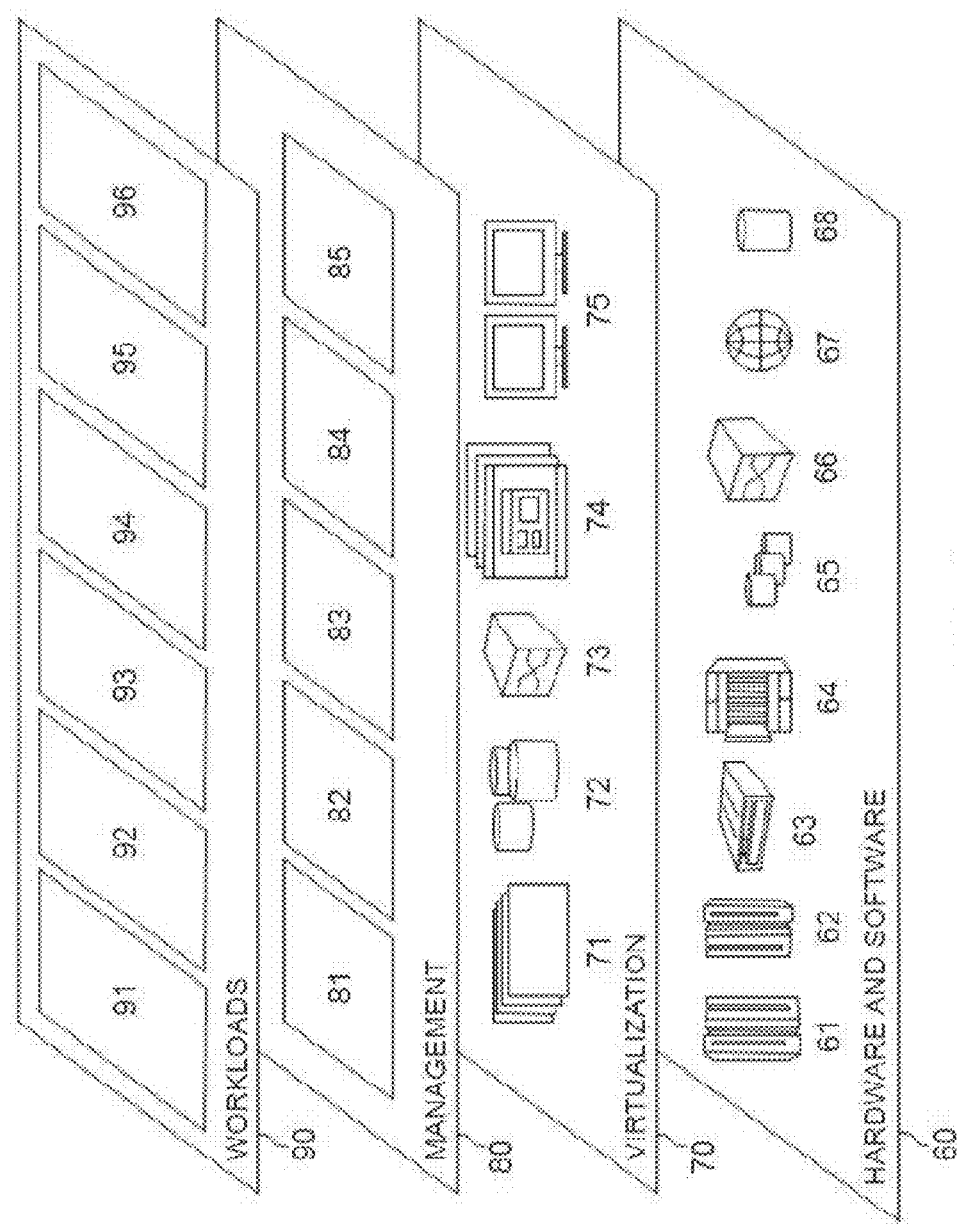
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for selective acceptance of a telephone call request based on recipient preference information according to aspects of the present invention 96.

Figure 3:
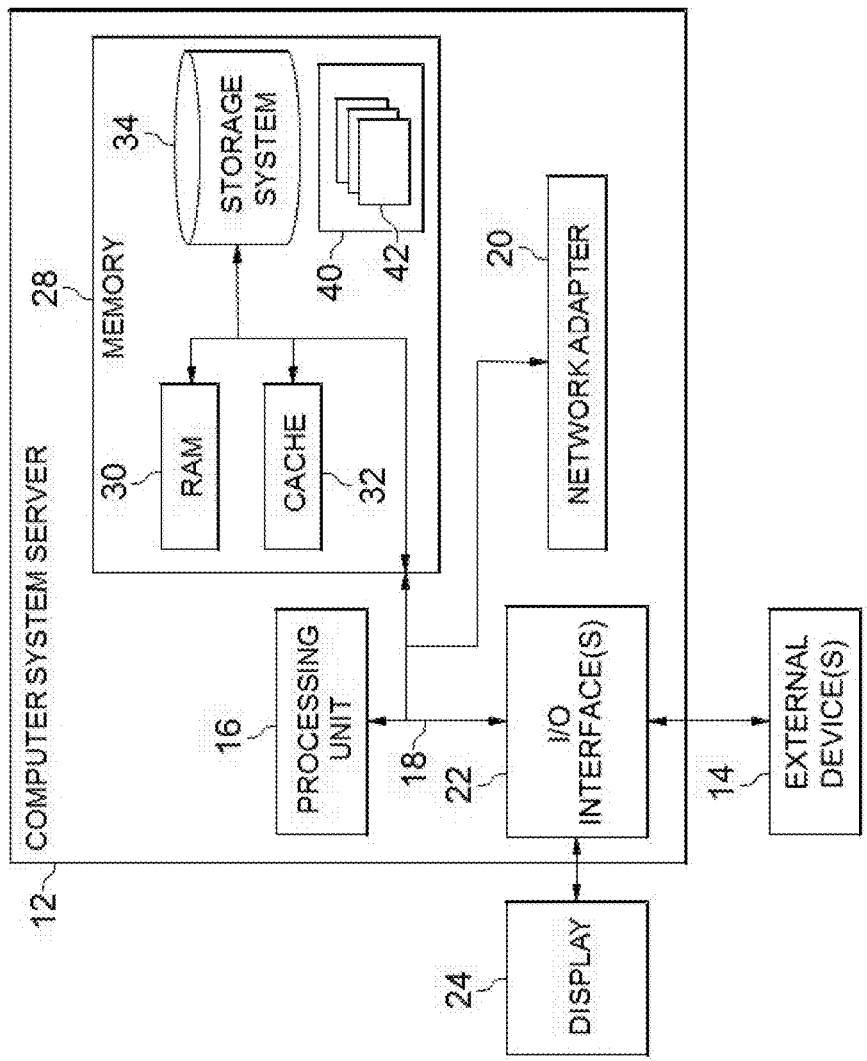
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 4:
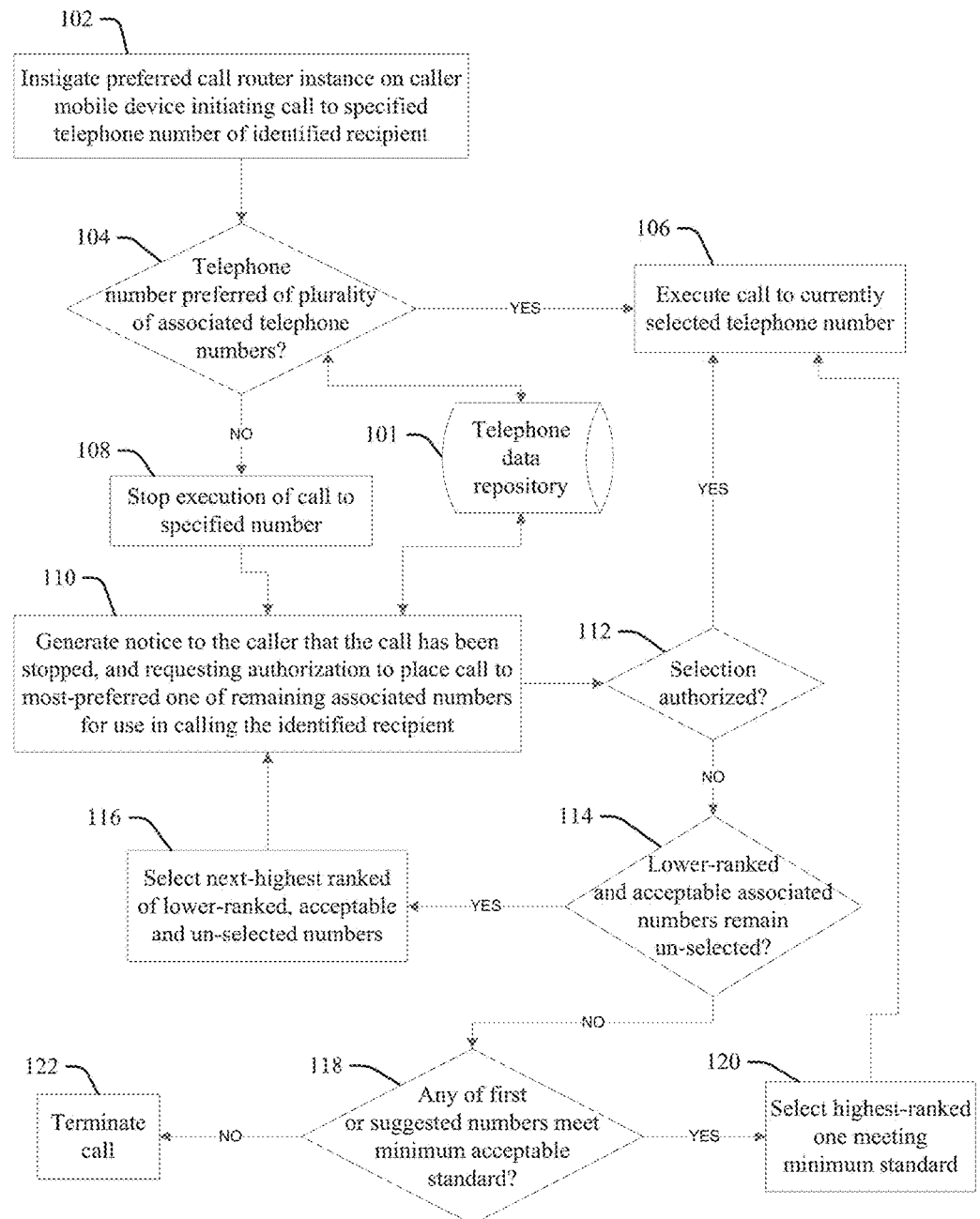
FIG. 4 is a flow chart illustration of one embodiment of the present invention.

FIG. 4 illustrates a system, process or device according to one embodiment of the present invention. At 102 a processor configured according to the present invention (the "configured processor") executes, generates, instigates, installs or otherwise creates a Preferred Call Router ("PCR") instance executing on a mobile device of a user that is initiating and placing a call (the caller) to a specified (first) telephone number of an identified recipient (the receiver) via a communication medium appropriate to the executing the call (via a cellular phone data or voice service, or a Voice-Over Internet Protocol (VoIP) application executing on a tablet or computer that transfers data across data network infrastructures, etc.).

At 104, in response to the initiation of the call to the first number, the PCR instance (configured processor) determines whether the first telephone number is a preferred (highest ranked, authorized, etc.) number of a plurality of different telephone numbers that are each associated to the identified recipient for use in calling or sending data to the recipient within a telephone database or other telephone data repository 101 as a function of time and geographic location of the identified recipient or receiving devices associated with the respective numbers for receiving the call, and or historic preferences of the identified recipient (which may include preferences of service attributes of each of the plurality of numbers (type of voice or data service, cost, reliability, data transmission quality, data transmission speed, etc.)): if so, then at 106 the configured processor enables or executes (places, completes, etc.) the call to the currently selected (here, the first) number.

Otherwise, in response to determining that the first number is not the preferred or highest ranked number of the plurality of numbers at 104, at 108 the configured processor stops execution or completion of the call to the specified (first) number, and at 110 generates a notice to the caller that the call has been stopped, and requests authorization to place the call to another (for example, second) most-preferred one of remaining other ones of the plurality of associated numbers (a higher ranked one relative to the first or currently selected number, and to all others of the numbers, or at least to all others of authorized ones of the other numbers, etc.) for use in calling the identified recipient. The generation at 110 may include driving a graphical user interface (GUI) display device to display a window comprising the notice information.

At 112 the configured processor determines whether the caller has provided the requested authorization (acknowledged, confirmed, etc.) to place the call to the second number: if so, at 106 the configured processor executes the call to the second (or other currently selected) number.

Otherwise, at 114 the configured processor determines whether any other lower-ranked or less preferred and acceptable ones of the plurality of associated numbers remain: that they have not already been suggested for authorization at 110; some embodiments further verify that the other numbers have attributes that meet minimum requirements of the call initiated at 102 (for example, they can provide minimum required data bandwidth, are not more expensive to use relative to a maximum cost threshold, etc.). If so, then at 116 the configured processor selects another (for example, a third, etc.) of the said remaining acceptable numbers that is next in preference or priority rankings to the number currently suggested at 110 (relative to said remaining others that have not yet been selected and suggested at 110), and returns to 110 to generate a revised notice suggesting the newly selected (next-highest ranked) number for use instead in order to complete the call.

In an optional process, some embodiments includes processes 118 and 120, wherein when the configured processor determines that no more alternative numbers remain eligible for selection at 114, at 118 the configured processor determines whether any of the first number specified at 102 and other numbers suggested at 110 meet a minimum acceptable standard for executing the call (for example, whether use of one of the numbers will not exceed a maximum cost standard, or that the recipient has at least once accepted a call to that number under current time, geographic location and data service conditions, etc.). If so, the highest-ranked one of a subset of the associated numbers that meet the minimum acceptable standard (an "acceptable number subset") is automatically selected at 120 for use in making the call at 106.

Alternatively, in response to determining that none of the alternative numbers are authorized at 112, and that none of the numbers considered or specified meet the minimum standard at 118, the configured processor terminates the call at 122. Termination of the call at 122 may include routing the caller to a voice mail or other messaging option, wherein the caller may leave a message that is instead routed to the identified recipient via a preferred one of the numbers or some other appropriate communication means (for example, transforming an audio data message into an audio file and sending the file to the identified recipient via an email account or text message service, etc.)

Thus, the configured processor may rapidly and instantaneously notify the caller (at 110) that the requested or specified number (at 102) is not the best, preferred or appropriate number to reach the caller in a current context (time, geographic location, service provider terms or costs, data quality or reliability, etc.), simultaneously suggesting another, preferred number to reach the identified recipient, such as via an "alert box" notice that notifies the caller that another number must be used to reach the identified recipient, and further wherein the PCR platform (configured processor) automatically stops or terminates an initiated call via the originally-requested number and instead starts another call process via the more appropriate number.

Embodiments of the PCR makes possible suggestions for acceptance or rejection to the caller based on current or prior preference information or requirements that are stored in memory 101 and accessible to the PCR instance, such as on a local memory device in circuit communication with the configured processor, as well as from dynamic, real-time information obtained from a remote server or other networked resource, or from another PCR instance executing on a mobile device of the identified recipient at the first number.

Figure 5:
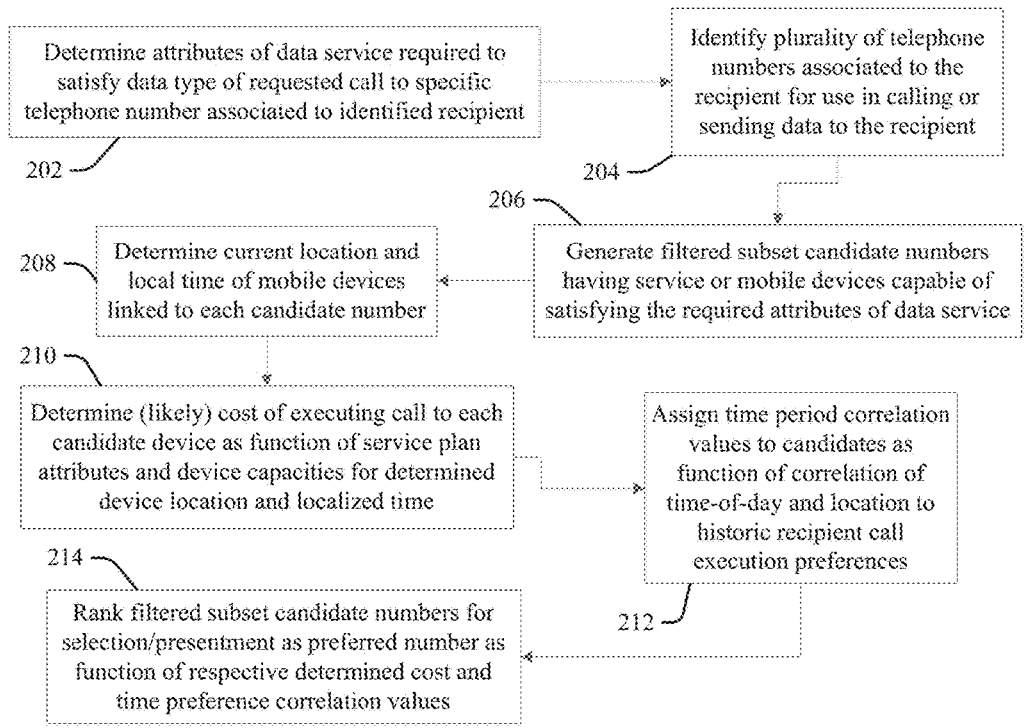
FIG. 5 is a flow chart illustration of another embodiment of the present invention.

A call request satisfied by embodiments of the present invention may involve different types of data, and originate from many different telecom service providers; and wherein the request immediately goes into the PCR instance for processing and determination of more-preferred numbers of pluralities of numbers that are associated with the recipient, based on attributes of each number and historic preferences of the recipient. FIG. 5 illustrates one embodiment of the present invention that ranks the pluralities of numbers that are associated with the recipient for presentation in suggestion to the caller (at 110, FIG. 4).

At 202 a processor configured according to the present invention (the "configured processor') executes, generates, instigates, installs or otherwise creates a Preferred Call Router ("PCR") instance executing on a mobile device of a user that determines attributes of data service that will be required to complete (satisfy) a type of requested call (voice or audio signal or data, or data transfer such as a text message, data file transfer, live video streaming, etc.) to a specific telephone number requested (at 102, FIG. 4) for use in reaching an identified recipient.

At 204 the PCR (configured processor) identifies the plurality of telephone numbers associated to the recipient for use in calling or sending data to the recipient, and at 206 filters out ones of the plurality of numbers that have telephonic or data service, or specific mobile devices models or configurations that are associated to their use in reaching the recipient, that are incapable of satisfying the attributes of data service determined as required to complete the requested call at 202, to thereby generate a filtered subset of candidate numbers that each have service or mobile devices capable of satisfying the determined, required attributes of data service.

The filtering process at 206 eliminates the numbers supported by services that do not adequately support the type of the requested call or data transfer (for example, cannot support live video streaming, or have limited or pricey data plans wherein streaming would likely be expensive to the caller or recipient), are linked to devices that cannot support the requested call or data transfer (for example, to a mobile phone with a screen display that does not meet minimum rendering, color reproduction or resolution requirements, or does not support a video encoder-decoder process used to send the video, etc.). The filtered, remaining subset of numbers not ruled out by service requirements, etc., are then used for subsequent rank-ordering processes, resulting in processing and time efficiencies deploying the embodiment relative to other embodiments or prior art alternatives that consider more possible numbers in making routing decisions (such as in prior art call-forwarding mechanisms).

At 208 the PCR determines the current location and local time of the mobile devices linked to each of the recipient's filtered subset of candidate numbers. Location can be determined using global positioning satellite (GPS) coordinates determined by GPS components of the respective mobile phones, via cell tower triangulation data, and still other methods will be apparent to one skilled in the art.

At 210 the PCR determines the (likely) cost of connecting and executing the phone call or data transfer request to each candidate device at their current location and time as a function of the respective service plan attributes and device capacities of each candidate telephone number. Thus, the configured processor determines whether standard or roaming charges apply to the current time and location of the calling and/or receiving devices and quantifies estimated amounts of those costs that are likely to be incurred in completing the call. For example, some embodiments may estimate a likely cost of a voice call at the identified roaming or standard data rate and charges for one minute, in response to determining that historic call data for the recipient indicates an average call duration time of one minute for all calls. Still other examples will be apparent to one skilled in the art.

At 212 the PCR assigns time-period correlation weighting or ranking values for selection of each of the respective candidates as a function of correlation of their respective time-of-day and location values to historic recipient call execution preferences. This comparison enables the PCR to determine whether a call or data transfer request is within the recipient's preferred time window for each device, or to what extent. For example, in response to determining that the recipient prefers to take calls during a business day time period on a first one of the candidate numbers, and calls after business day hours on another, second of the candidate numbers, the configured processor assigns a higher weighting or ranking value for selection of the first candidate phone relative to a value that it assigns to the second candidate, in response to determining that the local, location time of the candidate devices during the time of the requested call is during the business day period.

At 214 the PCR ranks the filtered subset candidate numbers for presentment as the preferred number to call the recipient (at 110, FIG. 4) as a function of the respective costs determined at 210, and the time preference correlation weighting or ranking values assigned at 212. The configured processor may differentially weight the cost and time preference correlation values in generating rankings at 214, for example, more heavily weighting or otherwise adjusting the cost-preference ranking values to have more influence on the generated rankings relative to the time preference correlation values. In some embodiments the configured processor uses the cost values as the primary ranking factor, wherein the time preference correlation values are used only to differentiate rankings between two numbers that have the same cost value.

Where recipient preferences are not clearly indicated by historic data, some PCR embodiments determine strength of correlation values of the time-of-day of the locations determined for the mobile devices linked to the filtered subset candidate numbers (at 212, FIG. 5) to historic recipient call execution preferences by applying Vapnik-Chervonenkis ("VC") dimension learning algorithm processes to infer (likely) user preferences from the historical data. VC dimensions used within the learning algorithm may be defined as a measure of the capacity (complexity, expressive power, richness, or flexibility) of a space of functions that can be learned by a statistical classification algorithm as a function of cardinality of a largest set of points.

Figure 6:
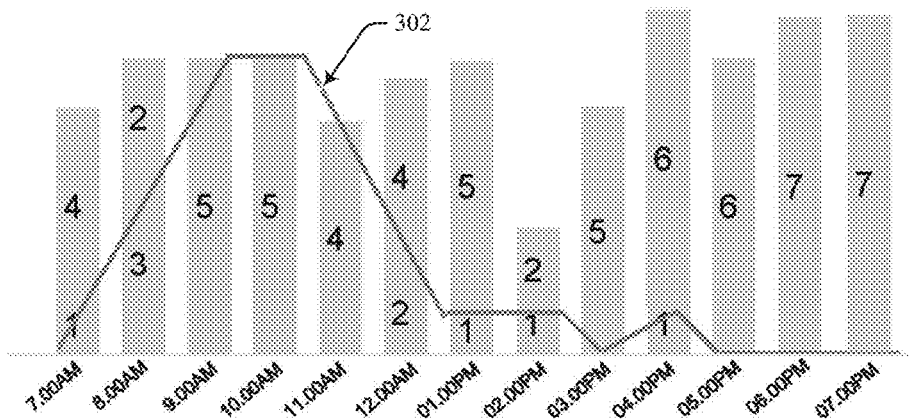
FIG. 6 is a graphical illustration of historic call recipient preference data according to an embodiment of the present invention.

For example, FIG. 6 is a graphical illustration that plots time-of-day against the call acceptance and rejection behavior for the call recipient for a specific type of call (for example, business, personal, social, sales, etc.) In one example the type of call is a "sales" call, one recognized as from a vendor who wishes to propose a sales agreement or activity to the recipient. The line 302 is a VC dimension plotted to represent to the number of sales calls historically accepted at any given one of the plotted time periods of day (represented by the lower number within each bar graph element), wherein the VC dimension 302 also reflects (in an inverse relationship) the numbers of sales calls rejected at those time periods (as represented by the upper number within each bar graph element).

Thus, in the present example, in response to the VC dimension 302 values, the configured processor assigns zero or lowest time preference correlation values for selection of a relevant candidate number for selection for execution of a sales call after 5 PM (as such calls are never accepted historically); highest values for the 9:00 AM, 10:00 AM and 11:00 AM hours (as such calls are always accepted then); and fractional or percentage values at the other time periods reflecting the relative likelihood of acceptance or rejections (for example, a 20% time preference correlation for a during the 7:00 AM period, as the recipient receives only 20% of the calls (one) relative the number of calls rejected (four) in the historical data during this time period).

Thus, aspects of the present invention prevent calls to disfavored numbers, and proposed and execute calls instead to alternatives of a plurality of recipient devices based on ranking the numbers as a function of recipient (and/or caller) cost, convenience, and preferences, and wherein the preferences may be dependent on a nature of the call or data transfer, as well as recipient location, local time of day, day of week, etc.

Call recipients may be associated to a wide variety of multiple cellular or remotely-accessible numbers, via the use of dual SIM card configurations within a single phone, as well as via carrying multiple phones or VoIP devices. Such recipients may select between different phones or phone numbers in meeting their calling needs based on location or timing: using one phone while traveling internationally, another while traveling but remaining within a single nation or other cellular service agreement boundary area, and yet another while in a home office. While recipients may set up call-forwarding processes and rules to avoid roaming charges while travelling, such prior art options generally require manual review, set-up, intervention and cancellation by the recipient to ensure that they are adequately defined, which may be a tedious, confusing and time-consuming process.

In contrast, embodiments of the present invention are response to user preferences determined via analysis of historic or real-time recipient behavior, enabled to thereby identify the importance or weight attributed to call acceptance or rejection behaviors or place, time, cost, etc. factors indicative of when the recipient is more likely to accept or reject a call to a given number. Embodiments dynamically understand user context and route calls accordingly, independent of the initial call selected by the caller and any call-forwarding rules in place for that selected number, avoiding roaming charges that may otherwise occur under the prior art when the recipient relies on obsolete or inaccurate call-forwarding rules (for example, the recipient may forget to cancel a call-forwarding rule upon returning home from travel, which in the prior art may unnecessarily route a call to a more-expensive options specified by the call-routing option).

Prior art call routing processes and systems may fail to adequately respond to both cost efficiencies and recipient preference requirements. Receiving a phone call or data transfer on a wrong or disfavored device or number may cause undesirable outcomes including, but no limited to, roaming charges, personal inconvenience, and inability to initiate or complete calls or data transfers. In contrast, PCR embodiments of the present invention may be natively installed on a recipient's device, as well as remotely accessed on a remote server or cloud configuration, and dynamically determine and set preferences in response to user call acceptance or rejection data, including in real-time, as well as enabling a recipient to set cost and data service parameters that enable the embodiments to propose alternative candidate numbers for calls and other data transfers on the mobile device that are more convenient, cost effective, or preferential to the recipient.

Embodiments also prevent incurring unintentional roaming charges. For example, a caller may intentionally select a first number to reach the recipient based on a call from their own cellular phone number based on the mistaken understanding that both devices and numbers are on the same service provider network, and therefore affords the lowest-cost options of the recipient's numbers. However, the caller may not be aware that the recipient is travelling out-of-country, and therefore that either or both of caller and recipient may incur roaming charges to complete the call on the selected number. Embodiments of the present invention are enabled to recognize that roaming charges will be incurred (as a function of determining the location data of the mobile device linked to the selected number), and to preempt completion of the call and to suggest a better number.

Some embodiments deploy PCR's on both caller and recipient phones that each communicate with a remote, common server resource, wherein the recipient may dynamically notify the caller PCR with current call preferences via the server. Thus, when the caller device places a call to the recipient, the server intercepts the call and places it on hold, collects preference, time, location and current service provider attributes for the recipient device from the recipient device PCR instance, and automatically accepts the call request and competes the call to the recipient device, or rejects and disconnects the requested call, in response to processing the data provided by the recipient device PCR instance.

The terminology used herein is for describing aspects only and is not intended to be limiting of the invention. As used herein, singular forms "a", "an", and "the" are intended to include the plural forms as well, unless the context clearly indicates otherwise. It will be further understood that the terms "include" and "including" when used in the specification specify the presence of stated features, integers, steps, operations, elements, and/or groups thereof. Certain examples and elements described in the present specification, including in the claims, and as illustrated in the figures, may be distinguished, or otherwise identified from others by unique adjectives (e.g. a "first" element distinguished from a "second" or "third" of a plurality of elements, a "primary" distinguished from a "secondary" one or "another" item, etc.) Such identifying adjectives are generally used to reduce confusion or uncertainty and are not to be construed to limit the claims to any specific illustrated element or embodiment, or to imply and precedence, ordering, or ranking of any certain elements, limitations, or process steps.

The descriptions of the carious embodiments of the present invention have been presented for the purposes of illustration but are not intended to be exhaustive or limited to the embodiments disclosed. Many modifications and variations will be apparent to those of ordinary skill in the art without departing for the scope and spirit of the described embodiments. The terminology used herein was chosen to best explain the principles of the embodiments, the practical applications or technical improvement over technologies found in the marketplace, or to enable others of ordinary skill in the art to understand the embodiments disclosed herein.

What is claimed is:

1. A computer-implemented method, comprising executing on a computer processor:

in response to initiation of a call by a caller to a first telephone number of a plurality of different telephone numbers that are each associated to an identified recipient, determining current locations and local times for a plurality of mobile devices that are linked for use in answering a requested call to one each of the plurality of different telephone numbers;

assigning time-period correlation values to each of the telephone numbers that represent relative amounts of correlation of their respective determined current locations and linked mobile device local times to a historic recipient call execution preference of the recipient;

determining costs of connecting and executing the requested call to the mobile devices linked to each of the telephone numbers at the current locations and the local times as functions of respective service plan attributes of each of the telephone numbers;

generating an ordered ranking of each the telephone numbers relative to others of the telephone numbers for preferred use in calling the recipient at the local time and geographic location of receiving mobile devices associated with each of the telephone numbers as a function of the time-period correlation values assigned to each of the telephone numbers and of the determined costs of connecting and executing the requested call to the mobile devices linked to each of the telephone numbers;

determining whether the first telephone number is ranked highest relative to others of the plurality of telephone numbers in the ordered ranking;

in response to determining that the first number is not ranked highest within the order ranking, stopping execution of the initiated call to the first number and requesting authorization from the caller to place the call to a second number of the plurality of telephone numbers that is ranked highest within the ordered ranking; and in response to determining that the caller has not provided the requested authorization, iteratively requesting authorization from the caller to place the call to another of the plurality of telephone numbers that is next-highest in rank, until placing the call to one of the telephone numbers that is next-highest in rank in response to determining that the caller has provided the requested authorization.

2. The method of claim 1, wherein the telephone numbers are ranked in the ordered ranking relative to the others of the telephone numbers for preferred use as a function of meeting historic attribute preferences of the identified recipient that are selected from the group consisting of type of voice or data service, cost, reliability, data transmission quality, and data transmission speed.

3. The method of claim 1, further comprising:
in response to determining that the caller has failed to provide the requested authorization to place the call to any of the telephone numbers that is next-highest in rank:
terminating the call; or
automatically selecting a highest-ranked one of the telephone numbers that also meets a minimum acceptable standard threshold for automatic selection and executing the call to the selected highest-ranked one of the telephone numbers that also meets the minimum acceptable standard threshold.

4. The method of claim 1, further comprising:
integrating computer-readable program code into a computer system comprising a processor, a computer readable memory in circuit communication with the processor, and a computer readable storage medium in circuit communication with the processor; and
wherein the processor executes program code instructions stored on the computer-readable storage medium via the computer readable memory and thereby performs the determining the current locations and local times for the mobile devices linked to the plurality of telephone numbers, the assigning the time-period correlation values to each of the plurality of telephone numbers, the determining the costs of connecting and executing the requested call to the mobile devices, the generating the ordered ranking of the plurality of telephone numbers, the determining whether the first telephone number is ranked highest relative to others of the plurality of telephone numbers in the ordered ranking, the stopping execution of the initiated call to the first number and requesting the authorization from the caller to place the call to the second telephone number, and the iteratively requesting the authorization from the caller to place the call to another of the plurality of telephone numbers that is next-highest in rank.

5. The method of claim 4, wherein the computer-readable program code is provided as a service in a cloud environment.

6. The method of claim 1, further comprising:
generating a filtered candidate subset plurality of the telephone numbers by filtering out ones of the plurality of telephone numbers that are incapable of satisfying attributes of data service required to complete the requested call as a function of limitations in service enabled by linked mobile devices used to answer the call; and
generating the ordered ranking of the telephone numbers from the filtered candidate subset telephone numbers.

7. A system, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
in response to initiation of a call by a caller to a first telephone number of a plurality of different telephone numbers that are each associated to an identified recipient, determines current locations and local times for a plurality of mobile devices that are linked for use in answering a requested call to one each of the plurality of different telephone numbers;
assigns time-period correlation values to each of the telephone numbers that represent relative amounts of correlation of their respective determined current locations and linked mobile device local times to a historic recipient call execution preference of the recipient;
determines costs of connecting and executing the requested call to the mobile devices linked to each of the telephone numbers at the current locations and the local times as functions of respective service plan attributes of each of the telephone numbers;
generates an ordered ranking of each the telephone numbers relative to others of the telephone numbers for preferred use in calling the recipient at the local time and geographic location of receiving mobile devices associated with each of the telephone numbers as a function of the time-period correlation values assigned to each of the telephone numbers and of the determined costs of connecting and executing the requested call to the mobile devices linked to each of the telephone numbers;
determines whether the first telephone number is ranked highest relative to others of the plurality of telephone numbers in the ordered ranking;
in response to determining that the first number is not ranked highest within the order ranking, stops execution of the initiated call to the first number and requests authorization from the caller to place the call to a second number of the plurality of telephone numbers that is ranked highest within the ordered ranking; and
in response to determining that the caller has not provided the requested authorization, iteratively requests authorization from the caller to place the call to another of the plurality of telephone numbers that is next-highest in rank, until placing the call to one of the telephone numbers that is next-highest in rank in response to determining that the caller has provided the requested authorization.

8. The system of claim 7, wherein the telephone numbers are ranked in the ordered ranking relative to the others of the telephone numbers for preferred use as a function of meeting historic attribute preferences of the identified recipient that are selected from the group consisting of type of voice or data service, cost, reliability, data transmission quality, and data transmission speed.

9. The system of claim 7, wherein the processor executes the program instructions stored on the computer-readable storage medium via the computer readable memory and thereby, in response to determining that the caller has failed to provide the requested authorization to place the call to any of the telephone numbers that is next-highest in rank:
terminates the call; or automatically selects a highest-ranked one of the telephone numbers that also meets a minimum acceptable standard threshold for automatic selection and executing the call to the selected highest-ranked one of the telephone numbers that also meets the minimum acceptable standard threshold.

10. The system of claim 7, wherein the processor executes the program instructions stored on the computer-readable storage medium via the computer readable memory and thereby:

generates a filtered candidate subset plurality of the telephone numbers by filtering out ones of the plurality of telephone numbers that are incapable of satisfying attributes of data service required to complete the requested call as a function of limitations in service enabled by linked mobile devices used to answer the call; and generates the ordered ranking of the telephone numbers from the filtered candidate subset telephone numbers.

11. A computer program product for selective acceptance of a telephone call request based on recipient preference information, the computer program product comprising:

a computer readable storage medium having computer readable program code embodied therewith, the computer readable program code comprising instructions for execution by a processor that cause the processor to:

in response to initiation of a call by a caller to a first telephone number of a plurality of different telephone numbers that are each associated to an identified recipient, determine current locations and local times for a plurality of mobile devices that are linked for use in answering a requested call to one each of the plurality of different telephone numbers;

assign time-period correlation values to each of the telephone numbers that represent relative amounts of correlation of their respective determined current locations and linked mobile device local times to a historic recipient call execution preference of the recipient;

determine costs of connecting and executing the requested call to the mobile devices linked to each of the telephone numbers at the current locations and the local times as functions of respective service plan attributes of each of the telephone numbers;

generate an ordered ranking of each the telephone numbers relative to others of the telephone numbers for preferred use in calling the recipient at the local time and geographic location of receiving mobile devices associated with each of the telephone numbers as a function of the time-period correlation values assigned to each of the telephone numbers and of the determined costs of connecting and executing the requested call to the mobile devices linked to each of the telephone numbers;

determine whether the first telephone number is ranked highest relative to others of the plurality of telephone numbers in the ordered ranking;

in response to determining that the first number is not ranked highest within the order ranking, stop execution of the initiated call to the first number and request authorization from the caller to place the call to a second number of the plurality of telephone numbers that is ranked highest within the ordered ranking; and in response to determining that the caller has not provided the requested authorization, iteratively request authorization from the caller to place the call to another of the plurality of telephone numbers that is next-highest in rank, until placing the call to one of the telephone numbers that is next-highest in rank in response to determining that the caller has provided the requested authorization.

12. The computer program product of claim 11, wherein the telephone numbers are ranked in the ordered ranking relative to the others of the telephone numbers for preferred use as a function of meeting historic attribute preferences of the identified recipient that are selected from the group consisting of type of voice or data service, cost, reliability, data transmission quality, and data transmission speed.

13. The computer program product of claim 11, wherein the computer readable program code instructions for execution by the processor further cause the processor to, in response to determining that the caller has failed to provide the requested authorization to place the call to any of the telephone numbers that is next-highest in rank:

terminate the call; or automatically select a highest-ranked one of the telephone numbers that also meets a minimum acceptable standard threshold for automatic selection and executing the call to the selected highest-ranked one of the telephone numbers that also meets the minimum acceptable standard threshold.

14. The computer program product of claim 11, wherein the computer readable program code instructions for execution by the processor further cause the processor to:

generate a filtered candidate subset plurality of the telephone numbers by filtering out ones of the plurality of telephone numbers that are incapable of satisfying attributes of data service required to complete the requested call as a function of limitations in service enabled by linked mobile devices used to answer the call; and generate the ordered ranking of the telephone numbers from the filtered candidate subset telephone numbers.

* * * * *